INVENTOR.
Ralph R. Teetor,
BY
Davis, Lindsey, Hibben & Noyes
Atty's.

United States Patent Office 2,916,100
Patented Dec. 8, 1959

2,916,100

VEHICLE SPEED MAINTAINING AND MAXIMUM SPEED CONTROLLING DEVICE

Ralph R. Teetor, Hagerstown, Ind., assignor to Perfect Circle Corporation, Hagerstown, Ind., a corporation of Indiana Application June 14, 1954, Serial No. 436,529

34 Claims. (Cl. 180—82.1)

The invention relates generally to speed control devices and more particularly to a device for assisting an automobile driver to drive at a desired speed.

In my Patent No. 2,519,859 issued August 22, 1950, there is disclosed a device of this general character, which indicates to the driver through a resistance to depression of the throttle control member or accelerator pedal that a predetermined speed of the vehicle has been reached, the device however permitting movement of the accelerator pedal beyond the point at which such resistance occurs, so that such predetermined speed may be exceeded when needed. The device shown in said patent provides for adjustment by the driver of the speed at which such resistance occurs so it can be suited to the proper speed for any given road condition or speed limit.

The general object of the present invention is to provide a novel speed control device which may be set to hold the automobile at a predetermined speed by holding the accelerator pedal at such position as to produce such speed so that the driver may remove his foot from the accelerator pedal and the automobile will continue to run at such speed.

Another important object is to provide a speed control device which has the feature of holding the accelerator pedal at such position as to produce a desired vehicle speed as well as the features of the device shown in my patent.

A further object is to provide a speed control device which may be set to hold the automobile at a desired speed but in which the holding means is disabled by slight depression by the driver of either the accelerator pedal or the brake pedal of the automobile as a safety feature, so that the automobile may be quickly returned to normal operation under full control of the driver.

Other objects and advantages will become apparent from the following description taken in connection with the accompanying drawings, in which.

The speed control device shown herein involves the same principles of operation as are utilized in the device shown in my prior patent and is constructed in a form similar to that shown in my copending application Serial No. 398,365, filed December 15, 1953, now Patent No. 2,837,060. The present embodiment, however, provides as an additional feature a means for holding the speed control member or accelerator pedal of the vehicle at such position as to produce a predetermined speed of the vehicle so that the driver may remove his foot from the accelerator pedal and the vehicle will continue to operate at such speed.

In both forms of speed control device shown in my prior patent and the above-mentioned copending application, a fluid pressure actuated means is provided for offering a resistance to depression or advancing movement of the accelerator pedal when the vehicle is operating at a predetermined speed. While the device may be operated with any of the various pressure fluids available in an automotive vehicle, I have shown the devices in my prior patent and copending application and the device herein disclosed as being operated by vacuum which is available in the intake manifold of the engine of the vehicle. When the term "pressure fluid" is referred to in the claims, it is intended that such expression is broad enough to cover any of the pressure fluids available in a vehicle of this character and to include vacuum.

A device of the character herein contemplated comprises generally means movable with the accelerator pedal of the vehicle and carrying a pressure-responsive member which, when pressure fluid is applied thereto, offers a resistance to further movement of the accelerator pedal. In the particular embodiment contemplated, vacuum from the intake manifold of the engine is used and the resistance is such that the accelerator pedal may be depressed or advanced further if desired against the resistance. Such advance of the accelerator pedal results in acceleration of the vehicle with a consequent reduction of vacuum in the intake manifold. Thus, the resistance is lessened if the accelerator pedal is depressed beyond the point where the resistance is first encountered. This is of advantage to the driver since there are times when it is advantageous, as in passing another vehicle, to be able to exceed the speed for which the device is set.

The vacuum is applied to a fluid pressure means movable with the accelerator pedal and is under the control of two factors, namely, the extent of depression of the accelerator pedal and the speed of the vehicle. The admission of vacuum is rendered responsive to the speed of the vehicle by a means of a governor having a drive connected to operate in timed relation with the vehicle speed. The governor operates a valve which cooperates with an opening in a means movable with the accelerator pedal to admit pressure fluid (vacuum in this instance) to the fluid pressure means to provide the resistance. The speed at which the vacuum is admitted to the fluid pressure means may be adjusted by adjusting a spring in the governor. The spring is preferably adjusted by a means mounted at a convenient point for the driver of the vehicle so that he can set it to obtain resistance to depression of the accelerator pedal at any vehicle speed he desires.

With the device shown in my prior patent or my copending application, the driver must maintain continued pressure on his accelerator pedal in order to maintain operation of the vehicle at the desired speed. On long drives, particularly in the country, this is rather tiring to the driver. The present device therefore includes a means for holding the accelerator at the predetermined speed for which the device is set, so that the driver may remove his foot from the accelerator pedal and thus avoid becoming tired in this respect. A positive locking means for holding the accelerator pedal in a predetermined position is undesirable from a number of aspects. Such a device requires a conscious effort on the part of the driver to release it and in an emergency this could cause disastrous results. Moreover, a driver might leave such a device in a locked condition when stopping and forget that fact when he started again so that the vehicle would tend to be accelerated too rapidly to the set speed. This of course would be highly undesirable.

The present device provides safety factors which avoids all of these difficulties. Thus, while the device provides means for holding the accelerator pedal in a position which would result in operation of the vehicle at a predetermined speed so that the driver may remove his foot from the accelerator pedal, the device is so constructed that a slight depressing movement of either the accelerator pedal or the brake pedal of the vehicle immediately releases the holding means and thus quickly returns the vehicle to normal operation under full control of the driver. In an emergency, the driver instinctively depresses the brake pedal so that the holding means of the device is thereby immediately disabled and the driver is not required to take some separate action to release the holding means other than what he normally takes under such emergency conditions. Should the emergency call for an increase in speed, the depression of the accelerator to produce such increase causes a release of the holding means. Thus, while the holding means is available when desired to avoid the tiring effect on the driver of holding the accelerator pedal depressed, the holding means is immediately released when the driver takes any other action usually involved in changing his rate of travel.

The holding means in its preferred form is also a fluid pressure means which is adapted to be rendered operable only when the driver takes certain steps to effect this result. Again, in the preferred form, vacuum is utilized in the holding means. Such holding means tends to advance or depress the accelerator pedal but exerts a smaller force than the resistance encountered in depressing the accelerator pedal when the predetermined speed has been reached. Thus, the holding means holds the accelerator pedal at the point where resistance is encountered to further depression of the accelerator pedal. Below such speed, the resistance is not encountered so that the holding means is free to move the accelerator pedal to a setting producing this speed. Above this predetermined speed, the resistance to further depression is greater than the force exerted by the holding means so that the accelerator pedal is thereby maintained at this point.

As in the devices shown in my prior patent and copending application, the present device comprises a housing 10 adapted to be mounted on a bracket 11 (see Fig. 1) secured in some convenient place under the hood of the vehicle. The housing 10 includes a cylinder portion in which is mounted a fluid pressure actuated means comprising in this instance a piston 13. The piston 13 is slidably mounted on a piston rod 14 (see Figs. 2, 5 and 6) constituting an operating member adapted to be connected to and move generally with the accelerator pedal. However, in this instance, the piston rod 14 has an element mounted thereon for limited movement relative thereto, said element comprising a sleeve 15. The cylinder portion 12 of the casing is adapted to be closed by a coverplate 16, and the latter has an outwardly extending cup portion 17 through the end wall of which the piston rod 14 and the sleeve 15 extend. Coverplate 16 is also provided with an attaching portion 20 (see Fig. 4) adapted to be secured to the bracket 11. The coverplate 16 is detachably secured to the cylinder portion 12 as by screws 21 and may be secured to the cylinder portion in different positions rotatively so that the device can be readily mounted in different makes of vehicles where the various items of equipment under the hood are mounted in different manners.

The sleeve 15 is adapted to be actuated by the accelerator pedal of the vehicle and to this end, the outer end of the sleeve is shown as being threaded at 22 to receive a rod 23. The exact mounting of the device and the position of the accelerator pedal will differ in different makes of vehicles and consequently the connection between the rod 23 and the accelerator pedal will differ. By way of example, I have shown in Fig. 1 a bellcrank 24 having one arm thereof secured to the end of the rod 23. The other end of the bellcrank, indicated at 25, is secured to a rod 26 connected to a bracket 27. The latter is here shown attached to a lever 30 pivotally mounted on the floor of the vehicle at 31 and constituting a portion of the linkage connecting the accelerator pedal with the carburetor control. The pivot 31 also supports the accelerator pedal shown at 32. With the present linkage, it is obvious that depression of the accelerator pedal 32 will result in movement of the sleeve 15 inwardly of the casing 10.

The sleeve 15 on its inner end is provided with a flange 33 (see Figs. 2, 5 and 6) to which is secured a stepped ring 34, as by screws. The sleeve 15 and the ring 34 are adapted to cause movement of the piston rod 14 except for a slight relative movement therebetween for purposes to be hereinafter described. To this end a second stepped ring 35 is mounted on the piston rod 14 and is adapted to engage a snap ring 36. The second stepped ring 35 has a flange 37 adapted to fit loosely between a step on the ring 34 and the flange 33 of the sleeve 15, the slight relative movement between the sleeve 15 and the piston rod 14, as mentioned above, being provided by the space indicated at 38 between the flange 33 and the snap ring 36. The stepped ring 34 is provided with an annular flange 40 adapted to bear against a spring disk or washer 41. The latter is seated on an insulating washer 42. The insulating washer 42 bears against the end of a cuplike hub portion 43 formed on the piston 13.

Figure 7:
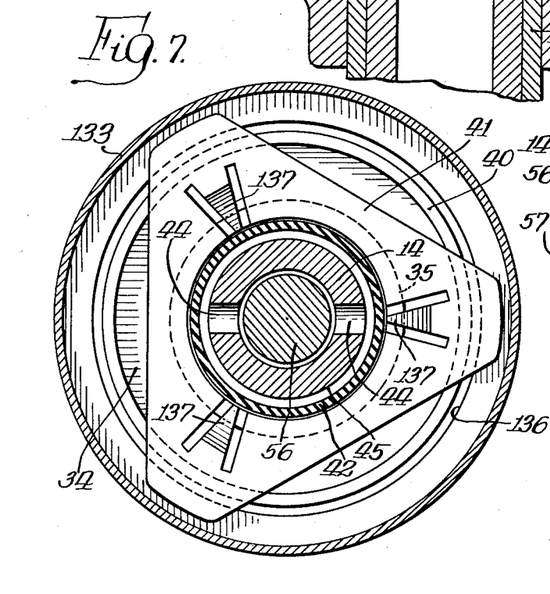
Fig. 7 is a fragmentary tranvserse sectional view taken on the line 7—7 of Fig. 5.

As heretofore mentioned, the piston 13 is adapted to be actuated by vacuum and to this end, the piston rod 14 is made in tubular form to carry the vacuum to the cylinder portion 12 of the casing. To provide communication between the interior of the piston rod 14 and the interior of the cylinder portion 12, the piston rod is provided with one or more radial openings 44 adjacent the insulating washer 42. In the present instance two such radial holes 44 are shown. The insulating washer 42 has an internal diameter somewhat larger than the piston rod 14 to provide an annular passage 45 communicating with the radial openings 44. The annular passage 45 communicates with a depression 46 formed in the second stepped ring 35 and one or more radial grooves 47 are cut in the ring 35. The spring washer 41 is triangular in form, as shown in Fig. 7, so that communication is thus provided with the interior of the cup portion 17 of the cylinder portion 12.

With foregoing structure, when vacuum is applied from the interior of the piston rod 14 through the radial openings 44, the annular passage 45, the depression 46, the grooves 47 and around the spring washer 41 to the interior of the cylinder portion 12, such vacuum will tend to draw the piston 13 downwardly. Downward movement of the piston 13, through the insulating washer 42 and the spring washer 41, tends to move the second stepped washer 35 downwardly, and its abutment with the snap ring 36 in the piston rod thus results in downward movement of the latter. Downward movement of the sleeve 15 also results from this, since the spring washer 41 at its inner periphery is arranged to engage the second stepped washer 35 and the flange 37 on the latter, after taking up the space 38, engages the flange 33 of the sleeve 15. Thus, when vacuum is applied to the piston 13 in the cylinder portion 12, a resistance to depression of the accelerator pedal 32 will thereby be provided.

Figure 3:
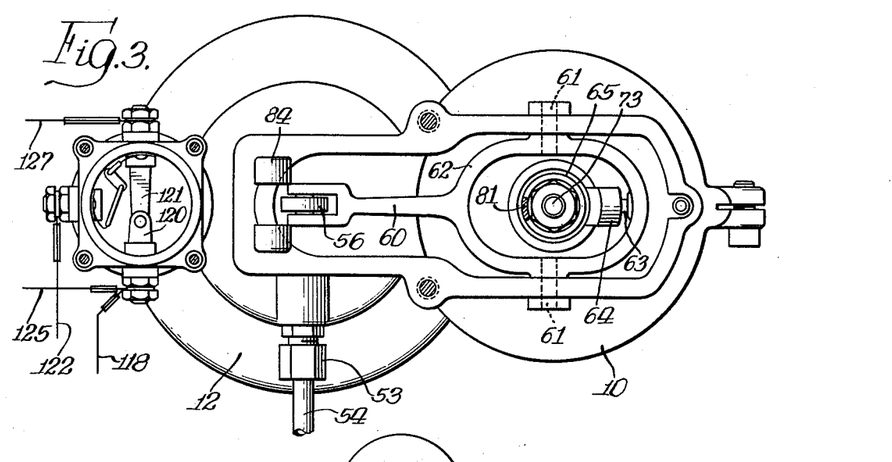
Fig. 3 is a plan view of the upper end of the device with certain cover portions removed and taken along the line 3—3 of Fig. 2.
Figure 4:
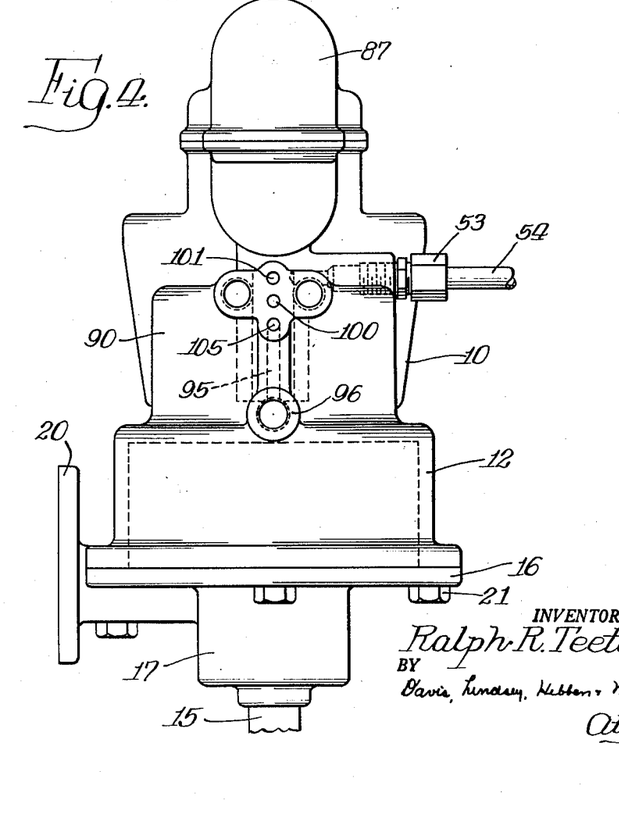
Fig. 4 is a side elevational view with certain parts of the device removed and taken along the line 4—4 of Fig. 2.

For admitting vacuum to the interior of the piston rod 14, its upper end extends into an elongated bearing sleeve 50 (see Fig. 2) formed in the casing 10. The bearing sleeve 50 provides a vacuum chamber 51 at its inner end, communicating through a passage 52 extending to the exterior of the casing 10 and provided with a pipe fitting 53 (see Figs. 1, 3 and 4). Connected to the fitting 53 is a tube 54 extending to the intake manifold of the engine, indicated at 55 in Fig. 1. Thus, vacuum from the intake manifold can be applied through the piston rod 14 to the piston 13.

As in the devices shown in my prior patent and copending application, a valve means within the piston rod 14 is provided to control the admission of vacuum to the cylinder portion 12. The valve means provides for opening and closing of the radial openings 44 in the piston rod 14, and consequently the admission of vacuum to the cylinder is determined by the position of the valve means and the position of the piston rod 14. The position of the valve means is determined by a governing device responsive to the speed of the vehicle.

In the present construction, the valve means comprises a valve rod 56 extending into the piston rod 14 from the upper end thereof but of smaller diameter than the interior of the piston rod so as to provide an annular space therebetween. At its lower end, the valve rod 56 has a flange 57 fitting snugly within the piston rod and adapted to slide over the radial openings 44. When the flange 57 is located at the radial openings 44, they are of course closed. When the valve rod 56 is moved downwardly and the flange 57 is below the radial openings 44, vacuum can pass between the valve rod 56 and the piston rod 14 to enter the cylinder portion 12. When the valve rod 56 is raised to move the flange portion 57 above the radial openings 44, the latter communicate with the interior of the piston rod 14 below the flange 57, and the lower end of the piston rod is vented to the atmosphere.

The valve rod 56 is adapted to be actuated by a governor means similar to that shown in my copending application. Thus, the upper end of the valve rod 56 is pivotally secured to one end of a lever 60. The lever 60 is pivotally supported by a pair of pivot pins 61 mounted in the casing 10 and extending into a yoke portion 62 of the lever 60. The other end of the lever 60 is provided with a ball joint 63 extending into the yoke portion 62 and having mounted thereon an arm 64 formed on a collar 65.

The governing means comprises a pair of centrifugal weights 66 pivotally supported at 67 on a rotating head 70. The weights 66 have inwardly extending arms 71 which bear against a collar 72 rotatably mounted on a bearing carried on a shaft 73. Upward movement of the collar 72 because of outward swinging movement of the centrifugal weights 66 causes upward movement of the collar portion 65 of the arm 64 and hence swinging movement of the lever 60 to move the valve rod 56 downwardly. The shaft 73 is mounted for longitudinal movement in a tubular governor shaft 74 which in turn is rotatably mounted in bearings 75 secured in the casing 10. To drive the governor shaft 74, a coupling member 76 is threaded on the end of the governor shaft 74 and extends through a cover 77 mounted on the casing 10 for connection with a flexible shaft 80. The flexible shaft 80 is adapted to be driven in timed relation with the speed of the vehicle and for this purpose is preferably connected to the speedometer drive cable (not shown) of the vehicle.

Outward movement of the centrifugal weights 66 is opposed by a trumpet-shaped spring 81 bearing against the collar portion 65 of the arm 64. The upper end of the spring 81 bears against a dished plate 82. The pressure exerted by the spring 81 is adapted to be adjusted to determine the vehicle speed at which vacuum will be applied to the cylinder portion 12 and hence the vehicle speed at which resistance is offered to depression of the accelerator pedal. To effect such adjustment lever 83 is pivotally supported at 84 on the casing 10 and has a conical point 85 bearing against the spring plate 82. Adjustment of the lever 83 is effected by a Bowden wire 86 connected thereto and extending to a point convenient to the driver. In the present instance, the Bowden wire 86 is shown as extending to the steering post of the vehicle and at its upper end is attached to a manually adjustable means (not shown). Thus, by adjusting the Bowden wire 86, the pressure exerted by the spring 81 against the action of the centrifugal weight 66 of the governor can be varied to adjust the vehicle speed at which vacuum will be admitted to the cylinder portion 12 by the flange 57 on the valve rod 56. The upper end of the spring 81 and the lever 83 are enclosed by a cover 87 secured to the casing 10.

As heretofore mentioned, the present invention includes means which is manually controlled for holding the accelerator pedal 32 at a point to produce a predetermined speed of the vehicle so that the driver can remove his foot from the accelerator pedal. Such speed is that at which resistance is offered to depression of the accelerator pedal as determined by the setting of the Bowden wire 86.

The manually controlled means is operated by pressure fluid and in the present instance is shown as being operated by vacuum since vacuum is also used to actuate the piston 13. This means tends to advance the accelerator pedal to the point where the vehicle reaches such speed that vacuum is admitted to the cylinder portion 12 to cause the piston to exert a resistance to further advancing movement of the accelerator pedal. The fluid pressure means for advancing the accelerator pedal exerts a smaller force than the resistance offered by the piston 13 when vacuum is admitted to the cylinder portion 12, so that the accelerator pedal is thereby held at the point where it first encounters the resistance of the piston 13.

The fluid pressure means for advancing the accelerator pedal is preferably in the form of a vacuum cylinder and piston. Thus, in this instance, the casing 10 is provided with a second cylinder portion 90 (see Fig. 2) in end-to-end relation with the cylinder portion 12, with the two portions opening into each other. The cylinder portion 90 is of smaller internal diameter than the cylinder portion 12 and has mounted therein a piston 91 provided with a cup-like hub portion 92 slidably mounted on the piston rod 14. The cylinder portion 90 is adapted to have vacuum admitted to the upper end thereof to draw the piston 91 upwardly therein, and movement of the piston rod 14 is effected by a snap ring 93 fitting in a groove in the piston rod and engaged by the end of the cup-like hub portion 92. When the piston rod 14 is drawn upwardly by the piston 91, such movement of the piston rod moves the second stepped ring 35 upwardly because of its abutment with the snap ring 36. The flange portion 37 on the second stepped ring 35 engages a portion of the first stepped ring 34, and since the latter is rigidly secured to the flange 33 of the sleeve 15 and the sleeve 15 is connected to the accelerator pedal 32, upward movement of the piston 91 will cause the accelerator pedal to be depressed or advanced to increase the speed of movement of the vehicle.

When the piston rod 14 has been moved upwardly in this manner and the valve rod 56 has been moved downwardly through the action of the governor on the increasing speed of the vehicle, the radial openings 44 will be opened by the flange 57 on the valve rod 56 to admit vacuum to the cylinder portion 12, thereby offering a resistance to further advancing movement of the accelerator pedal. Since the piston 13 is larger than the piston 91, upward movement of the piston rod 14 will stop at this point.

Should the resistance to travel of the vehicle change due to road conditions, such as moving up or down hill so that the speed of the vehicle tends to vary due to such change in resistance, the parts of the device automatically adjust themselves to maintain a constant vehicle speed. Thus, assume that the vehicle has been traveling on a level road and the piston rod 14 has been adjusted to the point where it is held stationary under the vacuum forces exerted on the pistons 13 and 91. If the vehicle should now encounter an upgrade in the road, such upgrade will of course slow down the speed of the vehicle and as a result the centrifugal weights 66 will exert a smaller centrifugal force and the spring 81 will thereupon swing the lever 60 to slightly raise the valve rod 56 and the flange 57 thereon. This action shuts off the application of vacuum to the piston 13 and opens the radial openings 44 in the piston rod to atmospheric pressure. The piston 91 can then raise the piston rod further to depress the accelerator pedal until such speed is attained as will again permit application of vacuum to the piston 13 through the radial openings 44 and the piston rod 14. The depression of the accelerator pedal in this manner is sufficient to maintain substantially the same speed as was maintained on the level road.

Should the vehicle now encounter a downgrade in the road, the speed of the vehicle will increase, tending to cause the centrifugal weights 66 to move farther outwardly. Such action of the weights causes the valve rod 56 to be depressed and vacuum is admitted to the cylinder portion 12. Since the piston 13 is larger than the piston 91, the admission of vacuum to the cylinder portion 12 will cause the piston rod 14 to be moved downwardly, which will result in movement of the accelerator pedal in a direction to decrease the speed of the vehicle. Such movement of the piston rod 14 continues until the vacuum is cut off from the cylinder portion 12 by the radial openings 44 being closed and then opened to atmosphere, by the flange 57 on the valve rod 56. Thus, the speed of the vehicle when on a downgrade will be maintained at substantially the same point as when the vehicle is traveling on the level. These adjustments of the parts by virtue of any slight change in speed will occur to meet every change in road condition without any conscious effort on the part of the driver. The only thing that he will notice during such variations in road condition is that the position of the accelerator pedal at which it is held will vary automatically.

A cup-like hub portion 92 on the piston 91 is provided so that it may telescope over the bearing sleeve 50 in which the piston rod 14 is slidably mounted. This permits a more compact arrangement of the parts. The cup-like hub portion 43 of the piston 13 is arranged to telescope over the cup-like portion 92 of the piston 91, while the cup-like portion 17 of the coverplate 16 provides space for movement of the cup-like portion 43 of the piston 13.

The space in the cylinder portion 90 below the piston 91 and the space in the cylinder portion 12 above the piston 13 are both maintained at atmospheric pressure and for this reason they open into each other so that one connection to the atmosphere may be provided. In the lower end of the cylinder portion 90 is a snap ring 94 arranged to prevent the piston 91 from accidentally being drawn out of the cylinder portion 90. To maintain the adjacent ends of the two cylinder portions at substantially atmospheric pressure, a passage 95 is provided in one wall of the cylinder portion 90 and opens into the cylinder portion 12. The passage 95 connects with a transverse passage extending to the exterior of the casing and in which is mounted a pipe fitting 96. Connected to the pipe fitting 96 is a tube 97 (see Fig. 1) which extends to the air cleaner, indicated at 98, of the engine. Thus the air in the adjacent ends of the cylinder portions is substantially at atmospheric pressure and any air taken into the cylinder portions 12 and 90 by movement of the pistons 13 and 91 will be clean air to avoid scoring of the cylinders and consequent chance of loss of vacuum.

To admit vacuum to the upper end of the cylinder portion 90 to cause actuation of the piston 91, a lateral passage 100 is formed in the cylinder portion 90 at the upper end thereof. Also formed in this portion of the casing 10 is a passage 101 extending inwardly to the vacuum chamber 51 surrounding the valve rod 56. Thus, the passage 101 is in communication with the tube 54 extending from the intake manifold of the engine.

Figures 2, 8:
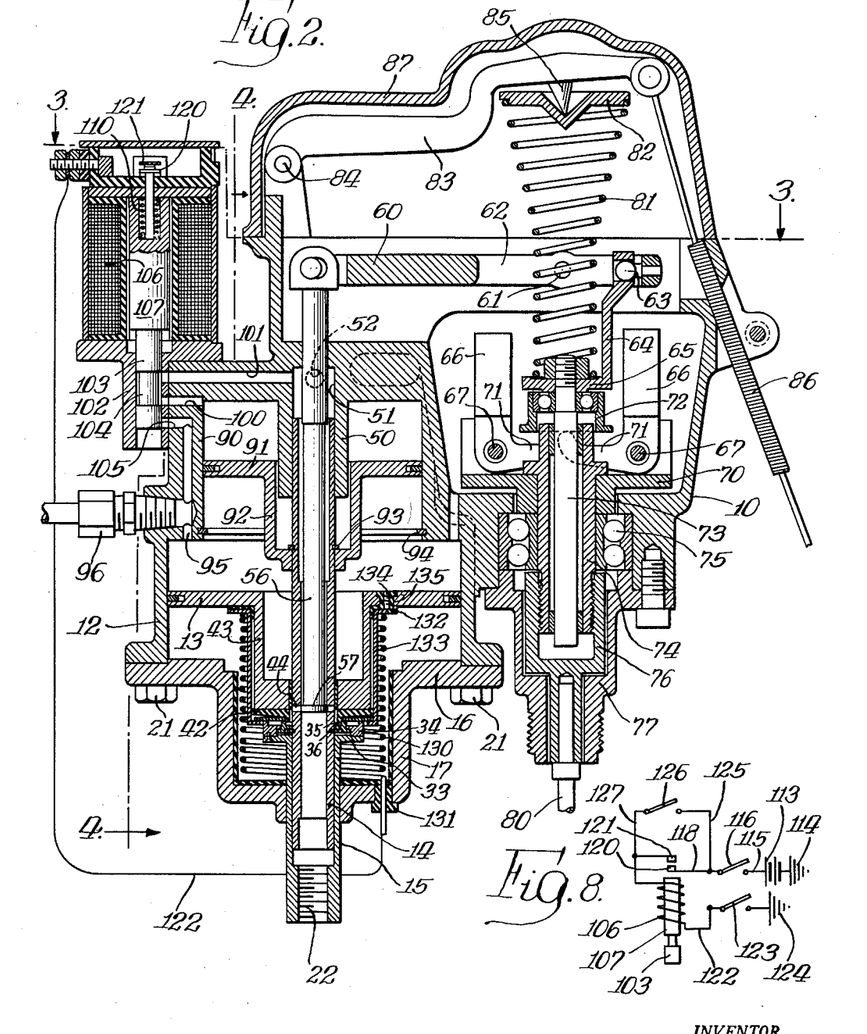
Fig. 2 is a longitudinal sectional view of the speed control device shown in Fig. 1.
Fig. 8 is a diagrammatic view of the electrical circuits involved in the device.

A connection between the passages 100 and 101 to apply vacuum to the piston 91 is provided by means of a valve structure mounted on the casing 10 adjacent these passages and comprising a valve body 102 in which is slidably mounted a valve member 103. The valve member 103 has a reduced portion 104 of sufficient length to connect the two passages 100 and 101 when the valve member 103 is raised, as shown in Fig. 2. When the valve member 103 is moved downwardly, the passage 101 is closed so that the connection with vacuum is thereby broken. However, when the valve member 103 is moved to its downward position, the reduced portion 103 provides a connection between the passage 100 and another passage 105 which communicates with an extension of the passage 95 leading to the air cleaner of the vehicle engine. In this position of the valve member 103, atmospheric air which has been cleaned by passing through the air cleaner of the engine will be admitted to the upper part of the cylinder portion 90 above the piston 91. Under this condition, the piston 91 is free to move in the cylinder portion 90 and exerts no upward force on the piston rod 14.

The valve member 103 is adapted to be shifted by manually controllable means. Obviously the means for admitting vacuum to act on the piston 91 to hold the accelerator pedal in a position to produce a predetermined vehicle speed must be under the control of the driver. The maintenance of vacuum acting on the piston 91 is also provided with certain safety factors so that it may be readily disabled preferably by movements which require no conscious effort on the part of the driver but are normal actions which he takes in any emergency. Thus, as heretofore mentioned, it is desirable to cut off the application of vacuum to the piston 91 either when the accelerator pedal 32 is depressed slightly or when the brake pedal of the vehicle is depressed. By cutting off the supply of vacuum to the piston 91, the vehicle is returned to normal operation so that the driver of a vehicle equipped with a device of the character herein shown is not required to take any special action in an emergency to disable the holding means.

Preferably the valve 103 controlling the application of vacuum to the piston 91 is actuated by electrical means which is readily adapted to provide the necessary safety factors. Thus, I provide a solenoid 106 mounted on the upper end of the valve body 102 with the valve member 103 extending upwardly into the solenoid as a core therefor, the core portion being indicated at 107. When the solenoid 106 is energized, the valve member 103 is raised to connected the passages 100 and 101 to apply vacuum to the piston 91. When the solenoid 106 is de-energized, a spring 110 mounted in the upper end of the core portion 107 of the valve member 103 forces the latter downwardly to connect the passages 100 and 105 to admit air under atmospheric pressure to the upper part of the cylinder portion 90.

The solenoid 106 is adapted to be energized by current supplied from the battery for the vehicle. Initially, the energization of the solenoid is effected by means of a manually operable switch which may thereafter be released and the circuit held closed by actuation of the valve member 103. The circuit for the solenoid also includes in series a switch which is adapted to be opened by slight depression of the accelerator pedal, and a second switch which is adapted to be opened by slight actuation of the brake pedal of the vehicle. When either of these switches are opened, the solenoid is deenergized and the circuit closing means actuated by the valve member 103 is opened since on deenergization of the solenoid 106, the valve member 103 is forced downwardly by the spring 110.

The particular circuit utilized in the present instance is indicated diagrammatically in Fig. 8. Thus, in this figure, I show the vehicle battery at 113 and as usual one side of the battery is grounded to the frame of the vehicle as at 114. The other side of the battery is connected by a line 115 to a switch 116 adapted to be actuated by the brake pedal indicated at 117 in Fig. 1. The switch 116 is normally closed when the brake pedal 117 is in its released position, but the switch 116 is adapted to be opened by the first part of the movement of the pedal 117 in applying the brakes. The brake-operated switch 116 is connected by a line 118 to a contact 120 on the solenoid 106. The contact 120 is adapted to be moved into engagement with a second contact 121 by upward movement of the core portion 107 of the valve member 103. The contacts 120 and 121 thus constitute a switch held closed by the solenoid. The contact 121 is connected to one end of the solenoid 106, and the other end of the solenoid is connected by a line 122 with a switch indicated in Fig. 8 at 123 constituting a part of the structure mounted on the piston rod 14 as more fully described hereinafter. The switch 123 is grounded as at 124 to the frame of the vehicle through the mechanical parts of the present device.

Figure 1:
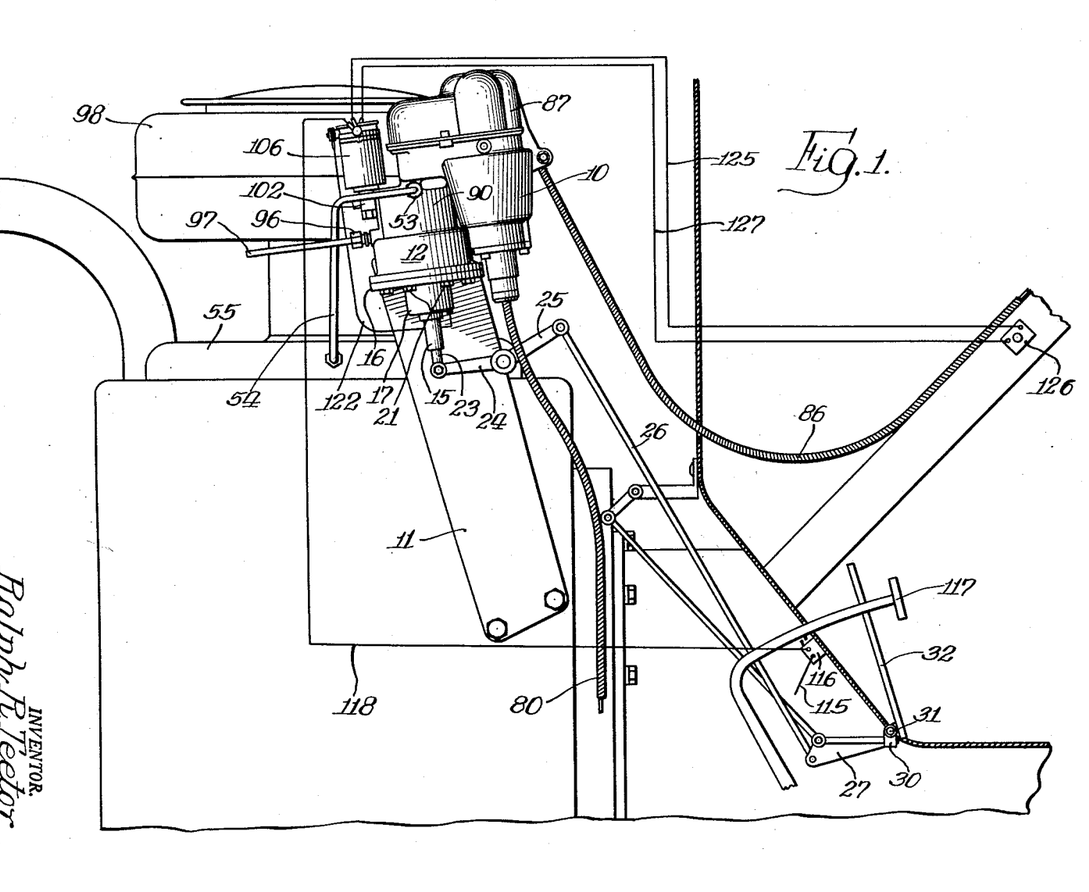
Fig. 1 is a fragmentary longitudinal sectional view of an automotive vehicle provided with a speed control device embodying the features of the invention.

When the two switches 116 and 123 are closed and the valve member 103 has been raised by the solenoid 106 to close contacts 120 and 121, the circuit through the solenoid 106 is closed and the latter is thereby energized. To initially close the circuit through the solenoid, in order to cause it to engage the contacts 120 and 121, a manually operable switch means in parallel with the contacts 120 and 121 is provided. Thus, in the present instance, a line 125 is connected to the line 118 by connecting it to the same binding post on the solenoid that the line 118 is connected to. The line 125 extends to a manually operable push-button switch 126 mounted in some location that is convenient to the driver, for example, on the steering post as shown in Fig. 1. The switch 126 is also connected by a line 127 leading to the contact 121 and the solenoid 106.

To cause admission of vacuum to the cylinder portion 90, so that the accelerator pedal may be held in a position to produce a given vehicle speed when the operator removes his foot therefrom, the push-button switch 126 is closed by the operator and the operator removes his foot from the accelerator pedal while holding the switch closed for reasons to be hereinafter set forth. The operator also keeps his foot off the brake pedal 117 so that the switch 116 is closed. A circuit is thereby established from the battery 113 through the brake switch 116, the push-button switch 126, the solenoid 106, the switch 123 actuated by the accelerator pedal to ground on the frame of the vehicle. Energization of the solenoid 106 by this circuit causes the valve member 103 to be raised to admit vacuum to the cylinder portion 90. Upward movement of the valve member 103 also closes the contacts 120 and 121 and thus maintains the circuit through the solenoid so that the push-button switch 126 may then be released.

The solenoid 106 holds the valve member 103 raised so that vacuum will be constantly applied to the piston 91 to hold the accelerator pedal in a position to produce the desired speed of the vehicle as heretofore described. The driver of the vehicle may therefore continue to drive the vehicle at a set speed without keeping his foot on the accelerator pedal, thus eliminating the tiring effect of maintaining the accelerator pedal depressed.

Should an emergency arise where the driver would need to apply the brake or where there is no emergency but he wishes to slow down, the first depression of the brake pedal 117 to effect such slowing opens the switch 116. This breaks the circuit through the solenoid, and the spring 110 therein immediately forces the valve member 103 downwardly to cut off the application of vacuum to the piston 91 and to open the circuit by separating the contacts 120 and 121. Thus, when the driver removes his foot from the brake pedal 117 and its return to inoperative position, closure of the switch 116 thereby will not reestablish the circuit through the solenoid since the contacts 120 and 121 are separated. To reestablish the circuit through the solenoid 106, the push-button switch 126 will again have to be closed as heretofore described.

As heretofore mentioned, the switch 123 is adapted to be opened to break the circuit to the solenoid 106 so as to cut off the application of vacuum to the piston 91 when the accelerator pedal 32 is slightly depressed. Following a period when the vehicle has been operated at the set speed of the device, there are of course periods when it is desirable to operate the vehicle at a slower speed. The holding effect of the piston 91 can then be removed by slight depression of the accelerator pedal at any position within its range of movement so that the vehicle will then be under the sole control of the driver and his actuation of the accelerator pedal. It is also undesirable to have a means which more or less permanently completes the electrical circuit and would maintain this condition even after the car had been stopped. If the electrical circuit were allowed to remain closed after stopping, the engine of the vehicle would immediately be accelerated on starting and would not maintain itself at idling speed as is ordinarily the case. With the present day automatic transmissions this would be especially undesirable since, with the circuit permanently closed, shifting the transmission into drive would cause a much too rapid acceleration of the vehicle.

On the present instance, the switch 123 is embodied in the connection of the sleeve 15 with the piston 13 and the associated parts heretofore described. The movement which effects opening and closing of the switch 123 is the slight relative movement between the sleeve 15 and the piston rod 14 heretofore referred to. To provide for opening and closing of the circuit, the line 122 extending from one end of the solenoid 106 is connected to a coiled conductor 130 (see Figs. 2 and 5) located within the cylinder portion 12 and extending into the cup-like portion 17 thereof. The interior of the cup-like portion 17 is lined with insulating material, and the lower end of the coiled conductor extends through the end wall of the cup-like portion 17 and is insulated therefrom by an insulating bushing 131. The upper end of the coiled conductor 130 bears against a flange 132 formed on a conductor sleeve 133 secured to but insulated from the piston 13. Thus, the flange 132 is secured as by screws 134 to insulating bushings 135 mounted in the piston 13.

The conductor sleeve is of larger internal diameter than the cup-like hub portion 43 of the piston so that it is spaced therefrom along the side thereof and at the lower end is held out of contact by the insulating washer 42. At its lower end, conductor sleeve 133 has an inwardly turned flange 136 adapted to engage the outer portions of the spring washer 41. The spring washer 41 is mounted on the insulating washer 42 and, as heretofore described, contacts the stepped ring 34 which is secured to the flange 33 of the sleeve 15. Since the sleeve 15 contacts other metal parts of the device and the device itself is mounted on the engine or other parts of the vehicle, the circuit is thereby grounded to the frame of the vehicle through the contact between the inwardly turned flange 136 on the contact sleeve 133 and the spring washer 41.

When the electrical circuit through the solenoid 106 has been established by pressing the push-button switch 126 and the driver has removed his foot from the accelerator pedal 32, the vacuum acting on the two pistons 13 and 91 holds the piston rod 14 in a predetermined position. The spring washer 41 is dished downwardly at its outer portions and is thus held in contact with the flange 136 on the contact sleeve 133. The spring washer 41 also presses downwardly on the annular flange 40 of the first stepped ring 34 and consequently tends to move the sleeve 15 downwardly relative to the piston rod 14. However, downward movement of the sleeve 15 relative to the piston rod is limited by the fact that the first stepped ring 34 engages the flange 37 on the second stepped ring 35, and the latter engages the snap ring 36 fitting in the groove in the piston rod 14. Thus, the sleeve 15 is held in its lower position relative to the piston rod 14 when the driver's foot is removed from the accelerator pedal and the vehicle is operating at the predetermined speed. Spring washer 41 at its inner periphery is provided with a plurality of fingers 137, three in the present instance, bent downwardly from the plane of the spring washer. These fingers 137 bear against the second stepped ring 35 and prevent accidental breaking of the circuit between the spring washer 41 and the flange 136 by chatter of the washer resulting from variations in the vacuum applied to the piston 13.

Figure 5:
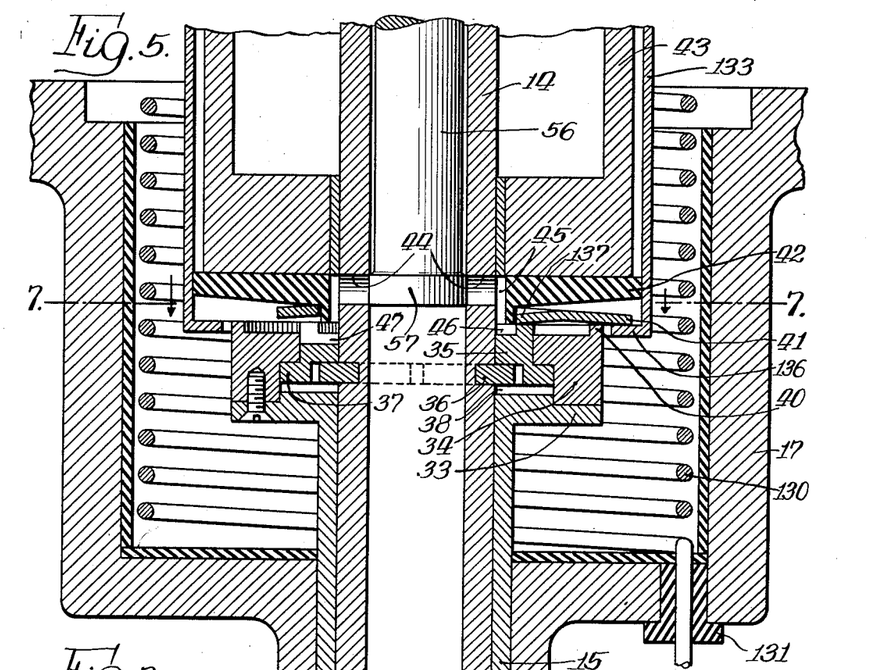
Fig. 5 is an enlarged fragmentary sectional view of a portion of the device as shown in Fig. 2.
Figure 6:
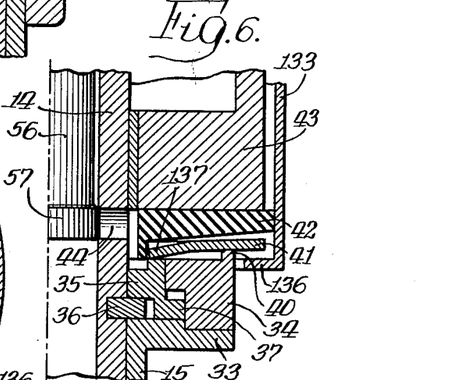
Fig. 6 is a fragmentary sectional view similar to a portion of Fig. 5 but showing the parts in a slightly different position.

The foregoing condition of the parts is shown in Fig. 5 of the drawings and illustrates the position of the parts for holding the circuit closed at that point, the closing of the circuit at that point being indicated by the switch 123 in the circuit diagram of Fig. 8. To open the circuit at that point by a slight depressing movement of the accelerator pedal 32, such movement of the pedal raises the sleeve 15. Upward movement of the sleeve 15 tends to raise the piston 13 through the contact of the stepped ring 34 with the spring washer 41 and the contact of the latter with the insulating washer 42 on the lower end of the piston 13. However, since vacuum tends to move the piston 13 downwardly, the spring washer 41 flexes and tends to flatten out as shown in Fig. 6. Such flattening of the spring washer 41 moves the outer portions thereof out of contact with the flange 136 on the conductor sleeve 133 to break the circuit therebetween. During such movement of the sleeve 15 and the stepped washer 34, which results in flattening of the spring washer 41 to move it out of contact, the sleeve 15 moves relative to the piston rod 14 as permitted by the space 38. Further depressing movement of the accelerator pedal after the space 38 has been taken up causes the sleeve 15 to engage the snap ring 36 to move the piston rod 14 as well as the piston 13 upwardly.

Breaking the contact between the spring washer 41 and the flange 136 on the conductor sleeve 133 constitutes opening of the switch 123. This opens the circuit to the solenoid 106, and the spring 110 thereupon moves the valve member 103 downwardly to cut off vacuum to the upper end of the cylinder portion 90 and opens such upper end to atmospheric pressure. The smaller piston 91 is therefore no longer urged upwardly so that the piston rod 14, and consequently the accelerator pedal 32, are under the full control of the driver except for the fact that resistance to depression of the accelerator pedal by virtue of vacuum applied to the larger piston 13 will be encountered when the accelerator pedal is depressed sufficiently to produce the predetermined speed. While it is not likely that the vehicle would come to a stop without the use of a brake, which of course would result in release of the fluid pressure holding means for the accelerator pedal, still if the vehicle should be stopped without the use of the brake, depression of the accelerator pedal during subsequent starting of the vehicle, which is a normal operation, would immediately release the fluid pressure holding means effected by the smaller piston 91.

When the vehicle is being operated below the speed at which resistance is offered to depression of the accelerator pedal and the upper part of the cylinder portion 90 is at atmospheric pressure, the usual spring in the vehicle which tends to return the accelerator pedal to idling position acts through the connections with the accelerator pedal to move the piston rod 14 downwardly. Such downward movement of the piston rod moves the smaller piston 91 downwardly since the snap ring 93 contacts the smaller piston. When the engine is at idling speed or stopped, the piston 91 is in the lower part of the cylinder portion 90. Under such conditions also, the coiled conductor 130 acts as a spring and tends to move the larger piston 13 upwardly since the larger piston is freely movable on the piston rod 14. In this position of the two pistons, the cup-like hub portion of the smaller piston 91 is telescoped within the cup-like portion 43 of the larger piston. The upward movement of the piston due to the spring action of the coiled conductor 130 moves the conductor sleeve 133 with it and because of the inturned flange 136 thereon, the spring washer 41 and the insulating washer 42 are also carried upwardly with the piston 13. These parts are free to move in this manner since they merely contact the upper surfaces on the two stepped rings 34 and 35 when the piston is moved downward. The two stepped rings 34 and 35 move with the sleeve 15 and the piston rod 14 except for the slight relative movement provided by the space 38 as heretofore described.

From the foregoing description, it will be apparent that the speed control device disclosed herein has all the features of the devices shown in my prior patent and my copending application and also has the feature of providing means for holding the accelerator pedal at such a position as to produce a desired vehicle speed. As in the former structures, the speed at which resistance is offered to the accelerator pedal may be adjusted by the driver. With the present construction, when the circuit is established through the solenoid 106 to apply vacuum to the piston 91, this piston tends to hold the accelerator pedal at a position which produces the same predetermined speed since the piston 91 causes depression of the accelerator pedal to the point where resistance to further depression is offered by the piston 13.

The holding effect provided by the action of the piston 91, which permits the driver to remove his foot from the accelerator pedal, will be immediately disabled either by slight depression of the brake pedal of the vehicle or of the accelerator pedal. In an emergency, the driver uses one or the other of these and therefore automatically disables the holding means and returns the vehicle to normal control. In providing for disabling of the holding means by slight depression of the accelerator pedal, I have also provided a feature which avoids any danger of the holding means being left effective when the vehicle is stopped and is started again. Thus, this device has this additional safety factor.

I claim:

1. In an automotive vehicle having a throttle control member and a brake operating member both adapted to be operated by the driver, fluid pressure means for moving said control member to and holding said control member at a position for operating the vehicle at a predetermined speed, valve means for controlling the application of fluid pressure to said first-mentioned means, a solenoid for shifting said valve means, and an electrical circuit for energizing said solenoid including a manually operated switch for closing said circuit for energizing said solenoid, a second switch closable by said solenoid to hold the latter energized after release of said manually operated switch, and a third switch opened by movement of said brake operating member to deenergize said solenoid and thereby open said second switch, whereby said manually operated switch most be reoperated to energize said solenoid.

2. In an automotive vehicle having an internal combustion engine and a throttle control member and an air cleaner therefor, a pair of vacuum cylinders, a piston in one cylinder for advancing said control member when vacuum is applied to one end of said one cylinder, a piston in the other cylinder for opposing the advancing movement of said control member at a predetermined vehicle speed when vacuum is applied to one end of said other cylinder, valve means for connecting said one end of said one cylinder to the intake manifold of the engine to apply vacuum to said one cylinder, other valve means for connecting said one end of said other cylinder to the intake manifold to apply vacuum to said other cylinder, and a connection for the other ends of both of said cylinders to the air cleaner to admit clean air at atmospheric pressure thereto.

3. In an automotive vehicle having an internal combustion engine and a throttle control member and an air cleaner therefor, a pair of vacuum cylinders in end-to-end relation and opening into each other, a piston in one cylinder for advancing said control member when vacuum is applied to the outer end of said one cylinder, a piston in the other cylinder for opposing the advancing movement of said control member at a predetermined vehicle speed when vacuum is applied to the outer end of said other cylinder, valve means for connecting the outer end of said one cylinder to the intake manifold of the engine to apply vacuum to the outer end of said one cylinder, other valve means for connecting the outer end of said other cylinder to the intake manifold to apply vacuum to the outer end of said other cylinder, and a connection for the inner end of one of said cylinders to the air cleaner to admit clean air at substantially atmospheric pressure to the inner ends of both cylinders.

4. In an automotive vehicle having a throttle control member, fluid pressure means for moving said control member to and holding said member at a position for operating the vehicle at a predetermined speed, said means including a movable rod and an element mounted thereon for limited movement relative thereto, said element being adapted to be connected to said control member, valve means for controlling the application of fluid pressure to said fluid pressure means, a solenoid for shifting said valve means, and an electrical circuit for energizing said solenoid including a switch adapted to be opened to deenergize said solenoid on said limited movement of said element relative to said rod by advancing movement of said control member.

5. In an automotive vehicle having a throttle control member, a fluid pressure means for advancing said control member, fluid pressure means for resisting advancing movement of said control member by said first-mentioned means at a predetermined vehicle speed, said first-mentioned means including a movable rod and an element mounted thereon for limited movement relative thereto and adapted to be connected to said control member, valve means for controlling the application of fluid pressure to said first-mentioned means, a solenoid for shifting said valve means, and an electrical circuit for energizing said solenoid including a switch carried by said second fluid pressure means and adapted to be opened to deenergize said solenoid on movement of said element relative to said rod by advancing movement of said control member.

6. In an automobile vehicle having a throttle control member, a first cylinder having a piston therein, a piston rod movable by said piston and operable for advancing said control member on application of vacuum to said cylinder, a second cylinder having a piston therein mounted on said rod and operable on application of vacuum to said second cylinder to resist advancing movement of said control member, a first valve means for controlling the application of vacuum to said first cylinder, a second valve means operable at a predetermined vehicle speed to apply vacuum to said second cylinder, a sleeve mounted on said rod for limited movement relative thereto and adapted to be connected to said control member, a solenoid for shifting said first valve means, and an electrical circuit for energizing said solenoid including a switch carried by the piston in said second cylinder and adapted to be opened to deenergize said solenoid by movement of said sleeve relative to said rod.

7. In an automotive vehicle having a throttle control member, a first cylinder having a piston therein operable for advancing said control member on application of vacuum to said cylinder, a piston rod movable by said piston, a second cylinder having a second piston therein mounted on said rod and operable on application of vacuum to said second cylinder to resist advancing movement of said control member, a first valve means for controlling the application of vacuum to said first cylinder, a second valve means operable at a predetermined vehicle speed to apply vacuum to said second cylinder, a sleeve mounted on said rod for limited movement relative thereto and adapted to be connected to said control member, a solenoid for shifting said first valve means, and an electrical circuit for energizing said solenoid including a switch adapted to be opened to deenergize said solenoid by movement of said sleeve relative to said rod, said switch comprising a flanged member mounted on said second piston, and a spring disk carried by said second piston and normally engaging said flanged member, said disk being engageable by said sleeve on said relative movement thereof to disengage from said flanged member and thereby open said circuit.

8. In an automotive vehicle having a throttle control member, a first cylinder having a piston therein operable for advancing said control member on application of vacuum to said cylinder, a piston rod movable by said piston, a second cylinder having a second piston therein mounted on said rod and operable on application of vacuum to said second cylinder to resist advancing movement of said control member, a first valve means for controlling the application of vacuum to said first cylinder, a second valve means operable at a predetermined vehicle speed to apply vacuum to said second cylinder, a sleeve mounted on said rod for limited movement relative thereto and adapted to be connected to said control member, a solenoid for shifting said first valve means, and a grounded electrical circuit for energizing said solenoid including a switch comprising a flanged member mounted on but insulated from said second piston, and a spring disk carried by said second piston and normally engaging said flanged member and said sleeve for grounding said circuit, said disk being movable by said sleeve on said relative movement thereof to disengage said flanged member and thereby open said circuit and deenergize said solenoid.

9. In an automotive vehicle having a throttle control member, a first cylinder having a piston therein operable for advancing said control member on application of vacuum to said cylinder, a piston rod movable by said piston, a second cylinder having a second piston therein mounted on said rod and operable on application of vacuum to said second cylinder to resist advancing movement of said control member, a first valve means for controlling the application of vacuum to said first cylinder, a second valve means operable at a predetermined vehicle speed to apply vacuum to said second cylinder, a sleeve mounted on said rod for limited movement relative thereto and adapted to be connected to said control member, a solenoid for shifting said first valve means, and a grounded electrical circuit for energizing said solenoid including a switch comprising a flanged member mounted on but insulated from said second piston, a coiled wire surrounding said flanged member and connected at one end thereto, the other end of said coiled wire extending through the ends of said second cylinder and being connected to said solenoid, and a spring disk carried by said piston and normally engaging said flanged member, said disk also normally engaging said sleeve for grounding the circuit and being movable by said sleeve on said relative movement thereof to disengage said flanged member and thereby open said circuit and deenergize said solenoid.

10. In an automotive vehicle having a throttle control member, a first cylinder having a first piston mounted therein, a second cylinder having a second piston therein, said cylinders being in end-to-end relation and having their inner ends opening into each other and having an opening to atmosphere, a tubular piston rod extending through said cylinders and carrying said pistons, means providing a vacuum chamber located at the outer end of said first cylinder, said piston rod extending into said chamber to admit vacuum to the interior of said rod, said means having a sealing portion about said piston rod and extending into the outer end of said first cylinder to prevent leakage between said first cylinder and said vacuum chamber, said first piston having a cup-shape hub portion telescoping over said sealing portion when said first piston moves toward the outer end of said first cylinder, and said second piston having a cup-shape hub portion telescoping over said hub portion of said first piston when said pistons are at the inner ends of the respective cylinders.

11. In an automotive vehicle having a throttle control member, an element adapted to be connected to said control member for movement therewith, a first vacuum-operated device for resisting movement of said element by advancing movement of said control member when vacuum is applied to said device, a governor-controlled valve dependent upon movement of said element to apply vacuum to said device at a predetermined vehicle speed, and a second vacuum-operated device tending to move said element to advance said control member when vacuum is applied to said second device, said second device holding said element in a position to apply vacuum to said first device at said predetermined vehicle speed whereby said control member is held in position to operate said vehicle at said predetermined speed.

12. In an automotive vehicle having a throttle control member, an element adapted to be connected to said control member for movement therewith, a first vacuum-operated device for resisting movement of said element by advancing movement of said control member when vacuum is applied to said device, a pair of relatively shiftable parts for controlling the application of vacuum to said device, one of said parts being shiftable with said element, a governor responsive to vehicle speed for shifting the other of said parts, and a second vacuum-operated device tending to move said element to advance said control member when vacuum is applied to said second device, said second device exerting a lesser force on said element than said first device whereby said element and said control member are held in such position that the vehicle will operate at said predetermined speed.

13. In an automotive vehicle having a throttle control member, a piston rod movable with said control member, a first cylinder, a first piston mounted on said piston rod in said first cylinder for resisting advancing movement of said control member when vacuum is applied to said first cylinder, a governor-controlled valve dependent upon movement of said piston rod to apply vacuum to said first cylinder at a predetermined vehicle speed, a second cylinder, a second piston mounted on said piston rod in said second cylinder and tending to move said piston rod to advance said control member when vacuum is applied to said second cylinder, and manually controlled valve means for applying vacuum to said second cylinder, said second cylinder and piston being smaller than said first cylinder and piston whereby said piston rod and said control member are held in such position that the vehicle will operate at said predetermined speed.

14. In an automotive vehicle having a driver-operated throttle control member, fluid pressure means for advancing said control member, fluid pressure means for opposing advancing movement of said control member by said first-mentioned means substantially at and above a predetermined vehicle speed, valve means for applying fluid pressure to said first-mentioned means whereby the latter tends to advance said control member, speed responsive valve means for applying fluid pressure to said second-mentioned means substantially at and above said predetermined speed, and manually controlled means for operating said first-mentioned valve means to apply fluid pressure to said first-mentioned means.

15. In an automotive vehicle having a driver-operated throttle control member, fluid pressure means for advancing said control member, fluid pressure means for opposing movement of said control member by said first-mentioned means substantially at and above a predetermined vehicle speed, valve means for applying fluid pressure to said first-mentioned means whereby the latter tends to advance said control member, speed responsive valve means for applying fluid pressure to said second-mentioned means substantially at and above said predetermined speed, manually controlled means for shifting said first-mentioned valve means to and holding it in a position to apply fluid pressure to said first-mentioned means, and means responsive to advancing movement of said control member by the driver to disable said manually controlled means.

16. In an automotive vehicle having a driver-operated throttle control member, fluid pressure means for advancing said control member, fluid pressure means for opposing movement of said control member by said first-mentioned means substantially at and above a predetermined vehicle speed, valve means for applying fluid pressure to said first-mentioned means whereby the latter tends to advance said control member, speed responsive valve means for applying fluid pressure to said second-mentioned means substantially at and above said predetermined speed, manually controlled means for shifting said first-mentioned valve means to and holding it in a position to apply fluid pressure to said first-mentioned means, and means responsive to actuation of the brake of the vehicle by the driver to disable said manually controlled means.

17. In an automotive vehicle having a driver-operated throttle control member, fluid pressure means for advancing said control member, fluid pressure means for opposing movement of said control member by said first-mentioned means substantially at and above a predetermined vehicle speed, valve means for applying fluid pressure to said first-mentioned means, speed responsive valve means for applying fluid pressure to said second-mentioned means substantially at and above said predetermined speed, manually controlled means for shifting said first-mentioned valve means to and holding it in a position to apply fluid pressure to said first-mentioned means, and a pair of means respectively responsive to advancing movement by said control member and to actuation of the brake of the vehicle by the driver to disable said manually controlled means.

18. In an automotive vehicle having a throttle control member, fluid pressure means for advancing said control member, fluid pressure means for resisting advancing movement of said control member by said first-mentioned member at a predetermined vehicle speed, valve means for controlling the application of fluid pressure to said first-mentioned means, electrical means for shifting said valve means to apply fluid pressure to said first-mentioned means, and an electrical circuit including a pair of engageable contacts carried by said second-mentioned means and adapted to be separated to disable said electrical means by pressure on said throttle control member against the resistance offered by said second-mentioned means.

19. In an automotive vehicle having a driver-operated throttle control member, fluid pressure means operable independently of actuation of said control member by the driver for advancing said control member to a position for operating the vehicle at a predetermined speed, manually set means separate from said control member for rendering said fluid pressure means effective for moving said control member to said position, and means responsive to pressure on said control member by the driver to disable said fluid pressure means for holding said control member advanced to said position, whereby said fluid pressure means is ineffective to hold said control member in said position when the driver releases pressure on said control member.

20. In an automotive vehicle having a driver-operated throttle control member, fluid pressure means for advancing said control member independently of advancing thereof by the driver, means for resisting advancing movement of said control member when the vehicle attains a predetermined speed to hold said control member in a position to operate said vehicle at said predetermined speed, manually set means separate from said control member for rendering said fluid pressure means effective, and means responsive to pressure on said control member by the driver to disable said fluid pressure means whereby said fluid pressure means is rendered ineffective to hold said control member at said position when the driver releases pressure on said control member, said resisting means thereafter remaining effective to resist advancing movement of said control member at said position.

21. In an automotive vehicle having a driver-operated throttle control member, fluid pressure means operable independently of actuation of said control member by the driver for advancing said control member to and holding said control member at a position for operating the vehicle at a predetermined speed, whereby said control member is held in said position without pressure thereon by the driver, manually set means for rendering said fluid pressure means effective, and means responsive to pressure on said control member by the driver for disabling said fluid pressure means to render it ineffective to hold said control member at said position to return said control member to full control by the driver, said fluid pressure means thereafter resisting advance of said control member by the driver beyond said position.

22. In an automotive vehicle having a driver-operated throttle control member, fluid pressure means operable independently of actuation of said control member by the driver for advancing said control member, governor-controlled means for resisting advancing movement of said control member operable only when the vehicle attains a predetermined speed to hold said control member in a position to operate said vehicle at said predetermined speed, manually set means for rendering said fluid pressure means effective, and means operable by the driver to disable said fluid pressure means whereby said fluid pressure means is rendered ineffective to hold said control member at said position, said governor-controlled means thereafter remaining effective to resist advancing movement of said control member at said position.

23. In an automotive vehicle having a throttle control member and a brake operating member both adapted to be operated by the driver, power-operated means for advancing said control member when the vehicle speed is below a predetermined value, electrical means for rendering said power-operated means operable, power-operated means responsive to vehicle speed for establishing a resistance opposing advancing movement of said control member when the vehicle reaches said predetermined speed, and an electrical circuit for energizing said electrical means including a manually operated switch for closing said circuit to energize said electrical means, a second switch closable by said electrical means to hold the latter energized after release of said manually operable switch, and a third switch opened by movement of said brake operating member to deenergize said electrical means and thereby open said second switch, whereby said manually operated switch must be reoperated to energize said electrical means.

24. A device for controlling the speed of an automotive vehicle having a throttle control member, said device comprising a movable operating member adapted to be connected to and moved by said control member, means operable to move said operating member in one direction for advancing said control member and to oppose movement of said operating member in said direction at and above a predetermined vehicle speed only, and means comprising relatively movable elements respectively responsive to the speed of the vehicle and the movement of said operating member for controlling said first-mentioned means to effect such opposition at a predetermined relative position of said elements.

25. In an automotive vehicle having a driver-operated throttle control member, power-operated means for advancing said control member, means responsive to vehicle speed for establishing a force opposing said advancing movement when the vehicle reaches a predetermined speed for limiting the advancing movement of said control member by said power-operated means to a position for operating the vehicle at said predetermined speed, and means responsive to establishment of said force for rendering said power-operated means operable to advance said control member.

26. In an automotive vehicle having a driver-operated throttle control member, power-operated means responsive to vehicle speed for establishing a resistance to advancing movement of said control member at a predetermined vehicle speed and for advancing said control member when the vehicle speed is below said predetermined speed, and means responsive to the establishment of said resistance for rendering said first-mentioned means operable for advancing said control member.

27. In an automotive vehicle having a driver-operated throttle control member, first power-operated means for applying a force of a first magnitude to said control member in a direction tending to move said control member toward idle position, control means responsive to vehicle speed for rendering said first means operable at and above a predetermined speed, and second power-operated means for exerting a second force of a second magnitude, less than said first magnitude, in a direction tending to advance said control member, whereby said control member is held in such position that said predetermined speed is maintained.

28. The combination of claim 27, including means for disabling said second power-operated means at will without disabling said first power-operated means.

29. The combination of claim 27, in which said first and second power-operated means comprise fluid pressure means, and said control means comprises a valve for controlling fluid pressure supplied to said first power-operated means.

30. The combination of claim 29, including a solenoid for shifting said valve, and an electrical circuit for energizing said solenoid including a switch movable on advancing said control member by the driver for opening said circuit to deenergize said solenoid.

31. A device for controlling the speed of an automotive vehicle having a throttle control member, said device comprising an operating member adapted to be connected to and moved with said control member, means operable to move said operating member in one direction for advancing said control member and to oppose movement of said operating member in said direction at a predetermined vehicle speed, and means responsive to the speed of the vehicle and the movement of said operating member for controlling said first-mentioned means to effect such opposition at said predetermined speed, said last-mentioned means comprising a governor responsive to the speed of the vehicle, and a member movable by the governor and cooperating with and movable relative to said operating member for controlling said first-mentioned means to effect such opposition.

32. In an automotive vehicle having a throttle control member, an element adapted to be connected to said control member for movement therewith, a first power-operated device for resisting movement of said element by advancing movement of said control member when power is applied to said device, a governor-operated power control dependent upon movement of said element to apply power to said device at a predetermined vehicle speed, and a second power-operated device tending to move said element to advance said control member when power is applied to said second device, said second device holding said element in a position to apply power to said first device at said predetermined vehicle speed whereby said control member is held in position to operate said vehicle at said predetermined speed.

33. A device for controlling the speed of an automotive vehicle having a driver-operated throttle control member movable from an idle position, said device comprising a movable operating member adapted to be connected to and moved by said control member, means operable to move said operating member in one direction for advancing said control member when the vehicle is operating below a predetermined speed and operable to move said operating member in the opposite direction to move said control member toward idle position when the vehicle is operating above said predetermined speed, and means for controlling said first-mentioned means to move said operating member in said opposite direction and comprising a pair of relatively movable elements, one movable in response to the speed of the vehicle and the other movable in response to movement of said operating member, said first-mentioned means maintaining a resistance tending to move the control member toward idle position when the driver holds said control member at a position to effect operation of the vehicle at a speed above said predetermined speed.

34. A device for controlling the speed of an automotive vehicle having a driver-operated throttle control member, said device comprising power-operated means responsive to vehicle speed for establishing a resistance to advancing movement of said control member at a predetermined vehicle speed, said power-operated means also being operable to advance said control member when the vehicle speed is below said predetermined speed, whereby said power-operated means constitutes an automatic control of the speed of the vehicle and maintains it at said predetermined speed, and driver-operated means for rendering said power-operated means inoperable to advance said control member and thereby disabling said automatic control with said power-operated means remaining operable for establishing said resistance at said predetermined speed, said power-operated means also maintaining said resistance when the driver overrides said automatic control by holding said control member at a position to effect operation of the vehicle at a speed above said predetermined speed.

References Cited in the file of this patent

UNITED STATES PATENTS

| | | |
|---|---|---|
| 1,077,818 | Eager | Nov. 4, 1913 |
| 1,607,392 | Denison | Nov. 16, 1926 |
| 1,833,908 | Maybach | Dec. 1, 1931 |
| 2,014,854 | Lothrop | Sept. 17, 1935 |
| 2,036,619 | Brown et al. | Apr. 7, 1936 |
| 2,111,284 | Girl et al. | Mar. 15, 1938 |
| 2,314,841 | Crafts et al. | Mar. 23, 1943 |
| 2,519,859 | Teetor | Aug. 22, 1950 |
| 2,554,619 | Goik | May 29, 1951 |
| 2,671,542 | Robnett | Mar. 9, 1954 |
| 2,714,880 | Riley | Aug. 9, 1955 |